United States Patent [19]

MacLeod

[11] 4,061,121

[45] Dec. 6, 1977

[54] MAGNETO-ALTERNATOR WITH MAGNETO ENERGY LIMITING

[75] Inventor: John Norman MacLeod, Ann Arbor, Mich.

[73] Assignee: Tecumseh Products Company, Tecumseh, Mich.

[21] Appl. No.: 573,101

[22] Filed: Apr. 30, 1975

[51] Int. Cl.$^2$ .................... F02P 1/02; H02K 21/22
[52] U.S. Cl. .................... 123/149 R; 123/148 AC; 310/153; 310/70 A
[58] Field of Search ....... 123/148 MC, 149 R, 149 A, 123/148 D; 310/70 R, 70 A, 153, 154, 155, 168

[56] References Cited

U.S. PATENT DOCUMENTS

| | | | |
|---|---|---|---|
| 2,583,466 | 1/1952 | Brownlee | 310/153 |
| 3,106,655 | 10/1963 | Carmichael | 310/153 |
| 3,114,851 | 12/1963 | Santi | 310/153 |
| 3,527,266 | 9/1970 | Santi | 310/70 A |
| 3,631,277 | 12/1971 | Ferdig | 310/154 |
| 3,663,850 | 5/1972 | Phelon | 310/153 |
| 3,741,185 | 6/1973 | Swift et al. | 123/149 D |
| 3,821,571 | 6/1974 | Honsho | 310/153 |
| 3,980,913 | 9/1976 | Peterson | 310/168 |

FOREIGN PATENT DOCUMENTS

| | | | |
|---|---|---|---|
| 1,133,771 | 2/1957 | France | 310/153 |
| 1,139,375 | 7/1957 | France | 310/153 |
| 1,340,636 | 9/1963 | France | 310/154 |

Primary Examiner—Ronald H. Lazarus
Assistant Examiner—P. S. Lall
Attorney, Agent, or Firm—Barnes, Kisselle, Raisch & Choate

[57] ABSTRACT

A magneto-alternator has a plurality of alternator coils for lighting or the like and a main ignition coil for a breaker-point ignition. Stator laminations are arranged so that the ignition coil is between two alternator coils and each coil is effectively on an E-shaped core with an outer leg of each E-shaped core being shared with an adjacent coil. The flywheel has a plurality of ceramic magnets having a high potential energy so that a high alternator output is developed. The center core leg of the E core on which the ignition coil is mounted has a large air gap relative to the air gaps at the other core legs to compensate for the high energy of the magnets and thereby limit current at the breaker points. The large air gap also makes the magneto output insensitive to production tolerances in the air gap.

29 Claims, 8 Drawing Figures

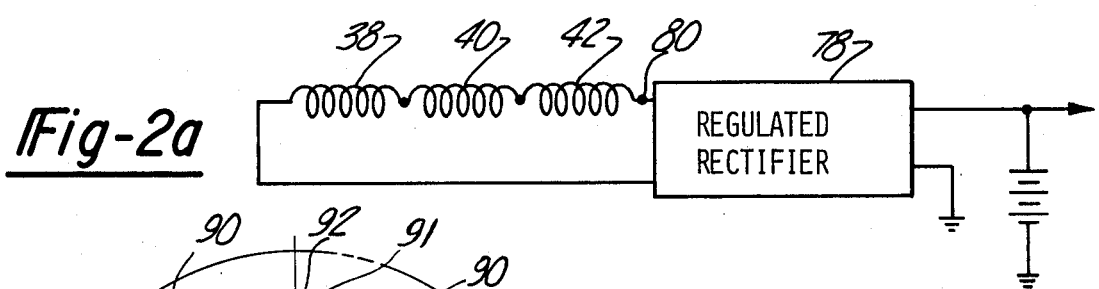
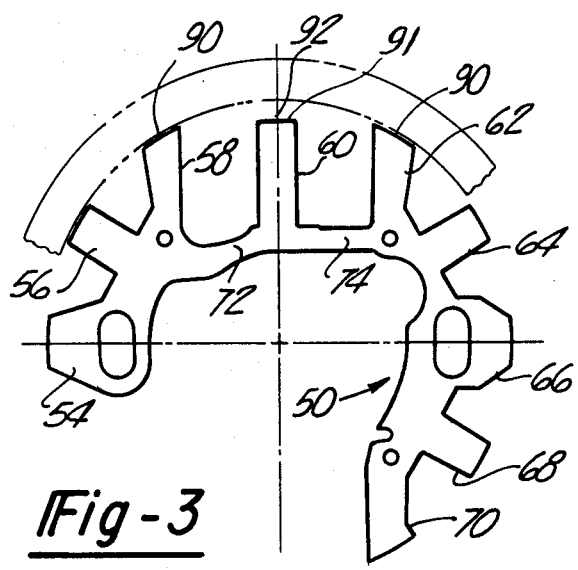
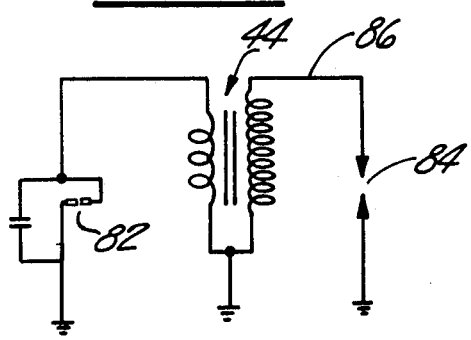
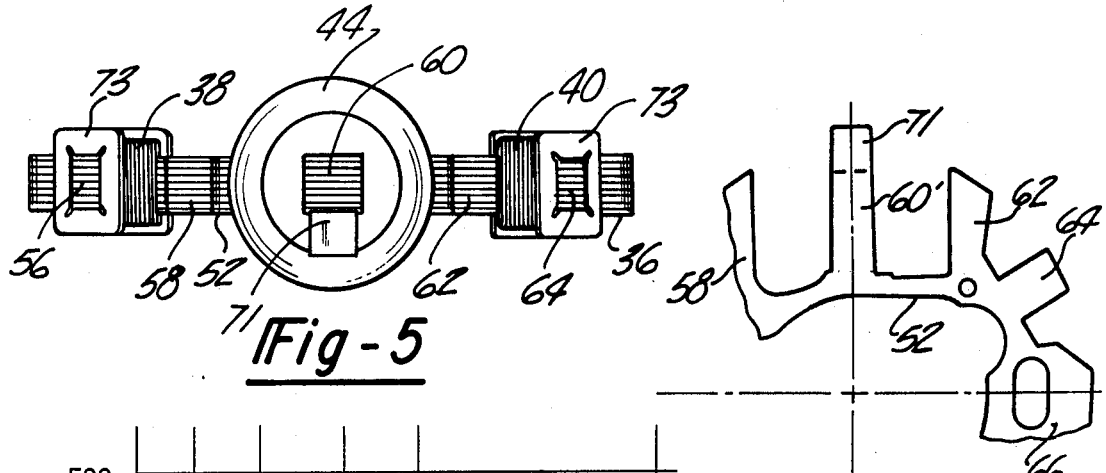
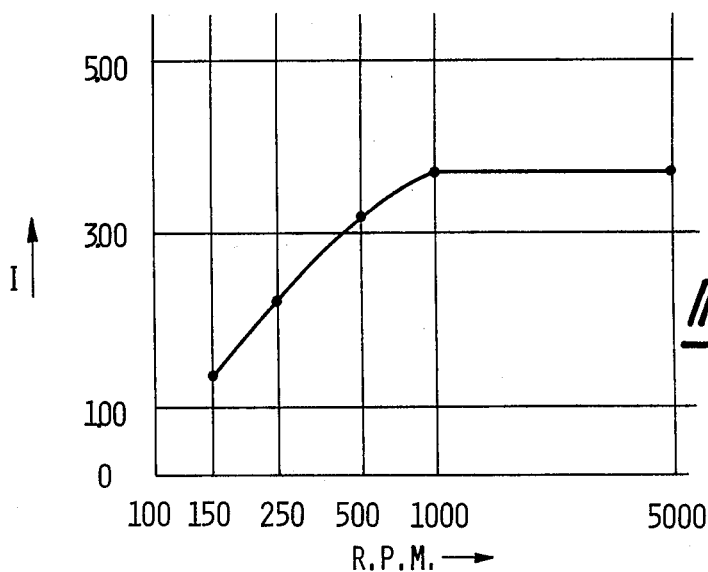

MAGNETO-ALTERNATOR WITH MAGNETO ENERGY LIMITING

This invention relates to a magneto for use on small internal combustion engines and, more particularly, to the rotor and stator construction of a combined magneto-alternator.

Cost savings are extremely important with small internal combustion engines that are mass produced at high volume. Magneto-alternators used on small engines are a significant cost factor, particularly where different magneto-alternators are used on what is otherwise basically the same engine. For example, for certain applications, only a low alternator output is required as for lighting; whereas for other applications, higher alternator outputs are required for additional lighting or for battery charging. To meet these different requirements, different stators and different flywheels have been used for several reasons. In a conventional magneto-alternator, there is only a limited space inside or beneath the conventional cup-shaped flywheel. Hence if higher alternator outputs were required using the same flywheel, the stator configuration was generally redesigned so that larger and additional coils could be added within the limited space under the flywheel. In order to get sufficient alternator output, the number of coils had to be increased. Due to the limited space available under the flywheel, different coil arrangements required different breaker-point boxes and different breaker-point subassemblies.

Alternator output could also have been increased by increasing the energy of the flywheel magnets. However, with alnico magnets heretofore available, it has been relatively expensive to use higher energy magnets to increase alternator output. If the magnet energy is increased substantially to obtain any meaningful increase in alternator output, then it would be necessary to also use a different magneto coil to prevent excessive current through the breaker points at normal operating speeds of the engine. Excessive breaker-point current causes pitting of the points and premature failure of the ignition. In recent years, high energy ceramic magnets have become available at low cost compared to alnico magnets; but until the present invention, the availability of the high energy ceramic magnets has not resulted in standardization and part interchangeability for magneto-alternators. This is perhaps due in part to other factors, for example, space limitations under the flywheel and excessive breaker-point currents when higher energy magnets are used.

Prior techniques for limiting ignition coil currents in alternator and non-alternator applications are primarily for correcting problems that occur at high rotational speeds. For example, short-circuited conductors such as a ring of conducting material have been used on the ignition coil core as shown in the U.S. Pat. No. 2,469,133 to Scott, granted May 3, 1949. A separate short-circuited winding has also been suggested to limit the charge coil output for a capacitor discharge ignition as shown in the U.S. Pat. No. 2,985,796, to Gayler, granted May 23, 1961. Such short-circuit arrangements either do not provide effective high speed limiting or they also decrease output at cranking and hence have only limited, if any, application. More importantly, the addition of a short-circuited conductor such as a shorting ring or a separate short-circuit winding adds to the production costs by reason of the cost of the additional part, additional labor and assembly costs and higher costs for inventory of parts.

The objects of the present invention include providing a magneto-alternator construction that achieves high alternator output without excessive currents in the ignition coil at engine operating speeds; that is compact, low in cost and simple in construction; that does not significantly impair magneto output at low or cranking speeds; and/or that achieves part standardization and interchangeability for magneto-alternators having different alternator output requirements.

A further object of the present invention is to provide a magnetic circuit for ignition applications that is insensitive to air gap variations with production tolerances.

Other objects, features and advantages of the present invention will become apparent from the following description, the appended claims and the accompanying drawings in which:

FIGS. 2a and 2b are simplified diagrams of alternator and ignition circuits, respectively;

FIG. 3 shows a stator lamination in the magneto-alternator of FIG. 1;

FIG. 4 shows an end lamination for the stator;

FIG. 5 is a view of the stator taken on lines 4—4 of FIG. 1 to illustrate a bent-over tab on the end lamination of FIG. 4 that holds the ignition coil in place;

Figure 7:
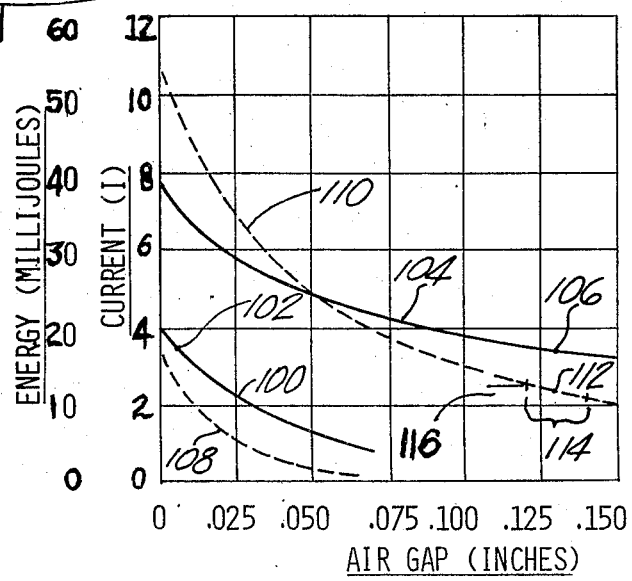

FIG. 6 is a plot of output current versus engine speed useful in understanding the present invention; and FIG. 7 is a further graph useful in understanding the invention. de Referring to the drawings in greater detail, the magneto-alternator of the present invention generally comprises a flywheel 10 having a generally conventional cup-shaped housing 12 that is fastened on the outer end of a crankshaft 14 for rotation by the engine. Flywheel 10 has a starter gear 16 on its outer periphery and six permanent ceramic magnets 18 equally spaced circumferentially on the inside of housing 12 and secured as by epoxy bonding. Each of the magnets 18 is charged with an effective north pole 20 and an effective south pole 22 to develop a strong magnetic field.

Inside flywheel 10 is a stator assembly 30 comprising a breaker-point box 32, a stator plate 34 and a laminated core 36 on which three alternator coils 38, 40, 42 and a magneto or ignition coil 44 are mounted. Core 36 is fastened to plate 34 and the stator assembly 30 is in turn fastened on the engine frame by the usual bolts 46. For purposes of the present application, except for the arrangement and construction of core 36 and coils 38, 40, 42, 44, the stator assembly may be considered conventional with the breaker box 32 arranged in a manner compatible with the core 36 and coils 38, 40, 42, 44 to fit underneath the flywheel 10. The overall arrangement of the magneto and the mounting of a stator assembly and a flywheel on an engine are well known in the art as shown, for example, by U.S. Pat. Nos. 2,469,133, 2,892,110 and 3,106,655.

The laminated core 36 comprises a stack of laminations 50 (FIG. 3) and one end lamination 52 (FIG. 4) having nine generally radial core legs 54, 56, 58, 60, 62, 64, 66, 68, 70. Adjacent core legs have radially outer end faces that are equally spaced circumferentially of the flywheel 10. Ignition coil 44 is mounted on leg 60 and is retained by a bent-over end tab portion 71 on leg 60' (FIGS. 4 and 5) of the end lamination 52. Alternator coils 38, 40, 42 are mounted, respectively, on legs 56, 64, 68 and retained in place by suitable spring clips 73. The circumferential spacing between the north pole 20 and the south pole 22 of each of the magnets 18 is equal to the circumferential spacing between each pair of adjacent core legs 54–70. Moreover, the circumferential spacing between each of the poles 20, 22 on one magnet 18 and the adjacent pole of opposite polarity on a circumferentially adjacent magnet is also equal to the circumferential spacing between the ends of the core legs. For example, the spacing between the south pole 22 on the top magnet 18 and the adjacent north pole 20' on the next adjacent magnet 18' in a clockwise direction is equal to the spacing between poles 20 and 22 on the top magnet 18 and also equal to the spacing between core legs 60 and 62. With this arrangement, it will be apparent that the flux paths for the various coils are through a generally E-shaped core with adjacent coils having a common or shared outer leg. For example, one flux path for coil 38 is through legs 54, 56 and a second flux path is through legs 56, 58. Similarly, one flux path for ignition coil 44 is through shared leg 58 and leg 60 and a second flux path is through leg 60 and leg 62. A first flux path for coil 40 is through shared leg 62 and leg 64 and a second flux path is through leg 64 and leg 66. The radially inner ends of the various core legs are joined to adjacent core legs through the laminations to complete the various flux paths. For example, a lamination portion 72 (FIG. 3) connects legs 58, 60, and a lamination portion 74 connects legs 60, 62. Alternator coils 38, 40, 42 are electrically connected in series with each other and then via lead 80 to a load circuit such as a regulated rectifier 78 (FIG. 2a) or directly to an AC lighting system (not shown). Ignition coil 44 is part of a conventional breaker-point ignition (FIG. 2b) having breaker points 82 with the secondary winding of coil 44 connected to a spark plug 84 via a high tension lead 86.

In accordance with another important aspect of the present invention, core legs 54, 56, 58, 62, 64, 66, 68, 70 all have small air gaps 90 (FIGS. 1 and 3) with magnets 18. Leg 60 has a radially outer end 91 forming a substantially larger air gap 92 with the magnets. The relatively large air gap 92 effectively regulates or limits the maximum current in coil 44 and hence limits current through breaker points 42 to an acceptable level at engine operating speeds in the manner illustrated by curve 94 in FIG. 6. In FIG. 6, current is plotted on a linear scale and engine rpm is plotted logarithmically to show that the primary current in the ignition coils peaks at about 1000 rpm and remains substantially constant up to about 5000 rpm. Below 1000 rpm, the magneto output is more than adequate for cranking to start the engine.

The magneto-alternator described hereinabove offers many advantages that might not be readily apparent. With the primary current in coil 44 limited at engine operating speeds, high energy ceramic magnets 18 can be used to optimize the outputs at alternator coils 38, 40, 42 using small alternator coils with fewer turns to develop a given alternator output. A substantial savings is realized since less copper wire is used in the coils 38, 40, 42. Since the alternator coils can be small, several coils (for example, the three coils shown) easily fit under the flywheel 10 and still provide large alternator outputs. Hence one stator assembly such as assembly 30 having three alternator coils can be designed for the higher alternator output requirements and then lower alternator outputs are easily achieved by omitting one of the coils. In one embodiment of the present invention, the stator assembly 30 having three alternator coils 38, 40, 42, as described, generated seven amps. By using only two coils of slightly different construction on legs 64, 68, a 3-amp alternator output was obtained. The stator assemblies were otherwise identical with the same breaker-point boxes 32 and the same magneto coil 44. Using the same ignition coil 44 for both high and low alternator outputs even though high energy ceramic magnets are used is an important advantage. Moreover, ignition coil 44 can be the same as that used on magnetos without an alternator. Current limiting at coil 44 and points 82 is achieved in an extremely simple and economical manner since the laminations 50, 52 are formed by stamping the exact dimension of leg 60, and hence air gap 92 can be easily varied by using different inserts in the stamping dies. This permits precise adjustment of the air gap for variations in the magnetic properties of the lamination material.

In the 3- and 7-amp embodiments previously referred to, leg 60 was approximately 0.100 of an inch shorter in a radial direction than the other core legs 54, 56, 58, 62, 64, 66, 68, 70 so that air gap 92 was 0.130 of an inch while the other air gaps 90 at the other core legs were 0.030 of an inch. For practical utilization of the present invention, the air gap 92 will be at least twice as large as the air gaps 90 and preferably at least three times larger. Of course, the exact dimension of the air gap will be selected such that the reluctance of the air gap and the back magnetomotive force from coil 44 provide the desired limiting effect. In the 3- and 7-amp embodiments described, the outer free end 91 of leg 60 was just radially inward of the radially outer face of the encapsulated ignition coil 44. That portion of what appears to be core leg 60 in FIG. 1 extending radially outwardly beyond coil 44 is the bent-over tab portion 71 of the core leg 60' on the end lamination 52. This tab 71 on a single lamination has very little effect on the air gap 92.

The larger air gap 92 also eliminates the effect of air gap tolerances on magneto performance. This result will be more readily apparent by reference to FIG. 7 wherein ignition coil current (I) and ignition coil energy are plotted against air gap length ($l_g$) for two magnetic structures. FIG. 7 is typical but not necessarily to scale. The curve 100 shows ignition coil current as a function of the air gap on the center leg of an E core using a heretofore conventional magnetic structure. The air gap was intentionally made small, nominally 0.010 of an inch to operate on the rapidly descending portion of the curve at point 102 and thus obtain a high output current (3.7 amps) for the lowest cost magnet. This cost factor was particularly important with alnico magnets. With prior uses of ceramic magnets, a relatively small air gap was retained for various reasons even though higher magnet energy was available at little increase in cost. By contrast, the curve 104 shows the ignition coil current versus air gap for a magnetic structure of the present invention using magnets of substantially higher energy, indeed substantially excessive energy by prior art standards. With the same ignition coil used in the magnetic structure for curve 100, the same output of 3.7 amps is obtained by operating at point 106 with a relatively large air gap of say 0.130 of an inch and operation is on the relatively flatter horizontal portion of curve 104. Thus an air gap variation within production tolerances has little effect on magneto output. It will be apparent that an excessively high point current would result if the magnetic structure characterized by the curve 104 is operated at the same air gap, for example, 0.010 of an inch as the structure characterized by curve 102.

The effect of operating at a large gap with high magnet energy is perhaps even more apparent by reference to the corresponding energy curves 108, 110 which depict the energy stored in the magneto coils as a function of air gap length. The energy curve 108 and the current curve 100 are for the same magnetic structure. According to the present invention, it has been recognized that if an unconventionally large energy ceramic magnet is used with an unconventionally large air gap to operate on the relatively flat horizontal portion of the curve, the magneto output does not vary significantly with variations in the air gap. The magnetic circuit for curves 110, 106 will be operating at point 112 on the energy curve 110. In a typical magneto application, production tolerances might generally be in the area of ± 0.010 of an inch and hence the magnetic circuit would have to be designed to operate over the range of from 0.120 of an inch to 0.140 of an inch as indicated at 114. Over this air gap tolerance, the energy at the coil would vary from 10 millijoules to 12 millijoules as indicated at 116. Hence for a usual production tolerance of 0.020 of an inch, the energy variation is on the order of 20 percent. In general, the magnetic circuit constructed according to the present invention maintains the energy variation at normal production tolerances well within the 20 percent range. By contrast, if the magnetic circuit depicted by curves 104, 110 is operated at a small air gap of say 0.020 of an inch, an energy variation of approximately 40 percent would be realized. Such a large variation would not be acceptable for many applications. Hence as a practical matter, the magnetic circuit should be operated so that the energy output variation for normal production tolerances in the air gap should be on the order of 20 percent.

FIG. 7 also shows that the magnetic circuit of the present invention, as indicated earlier, intentionally operates at a very low efficiency. A relatively small portion of the total energy available from the magnet is used at the magneto coil with the remaining energy being required to maintain the magnetic field across the gap. Referring again to the curve 110, the total energy available from the magnet would be approximately the energy available at zero air gap or say 55–60 millijoules, the energy actually used at the coil at an air gap of 0.130 is 12 millijoules, and approximately 42 millijoules are required to maintain the field at the air gap. The magnetic efficiency of the magneto coil based on the total energy available from the magnet is approximately 22 percent. By contrast, prior art magnets conventionally were operated at smaller air gaps and substantially higher magnetic efficiencies of at least greater than 50 percent and often substantially higher in certain applications, for example, with alnico magnets. Hence according to one important aspect of the present invention, the magnetic circuit is operated at an efficiency of at least less than 50 percent and preferably less than 30 percent. The present invention is potentially useful in a wide variety of magnetic circuits other than the specific magneto-alternator disclosed herein in order to make the coil output insensitive to air gap variations by using an unconventionally high energy magnet with an unconventionally large air gap.

Figure 1:
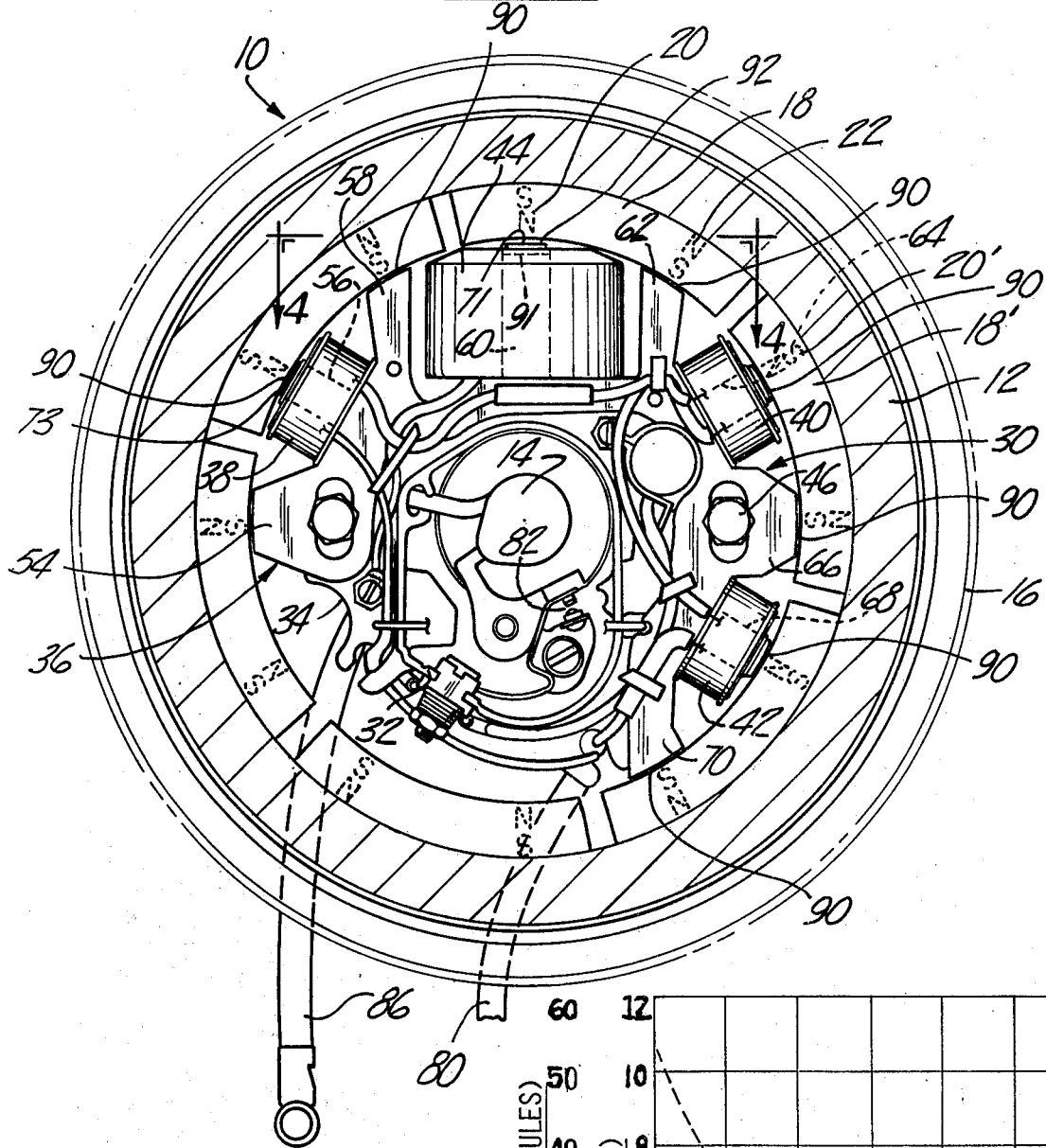
FIG. 1 is a plan view of a magneto-alternator of the present invention.

Further advantages are also realized because each of the coils effectively has an E-shaped core and, as is well known, an E configuration optimizes coil output as the flux rapidly changes direction through the center leg of the E. However, where the ignition coil 44 shares a respective outer leg 58, 62 of the E core with respective alternator coils 38, 40, the adjacent coils 38, 40 could have an adverse effect on the ignition coil output in the absence of the limiting provided by the large air gap 92. For example, flux from the south pole 22 (the top magnet 18 with the parts positioned as shown in FIG. 1) passes through core legs 62 and 60 back to the north pole 20. Flux from the same south pole 22 also passes through legs 62, 64 to the north pole 20' of the next adjacent magnet 18'. Hence it will be apparent that the flux available for coil 44 is dependent upon the reluctance of the magnetic path through leg 64 which in turn depends on the load at coil 40. Similarly, the flux available for coil 44 is also dependent on the reluctance of the magnetic path through leg 56 which in turn depends on the load at coil 40. If all of the available flux at legs 58, 62 would be forced into leg 60 due to the loading at coils 38, 40, and in the absence of the limiting effect of air gap 92, an excessive breaker-point current would be developed.

In practice, the north and south poles 20, 22 are provided by zone charging in radially polarized directions so that a north pole is directed radially inwardly at one end of magnet 18 (with a south pole being directed radially outwardly) to provide the effective north pole 20. The south pole is directed radially inwardly at the other circumferential end of the magnet (with a north pole being directed radially outwardly) to provide the effective south pole 22. Hence it is perhaps more accurate to refer to the magnet arrangement as being 12 poles rather than six magnets. The magnets 18 are epoxy bonded directly to flywheel housing 12 so that the various magnetic flux paths previously referred to are completed through the housing. To provide a high potential energy, the magnets are made of ceramic material having a high energy product, for example, 3.5 megagauss-oersteds. The ceramic material should also have a high coercive force, for example, 2400 oersteds. It should also be noted that the potential energy of magnets 18 is a function of the energy product and the volume of the material. With high energy, radially polarized magnets, a simple magnetic structure can be used economically without pole shoes by using a large magnet overhang. The required volume of magnetic material easily fits with the space available at the flywheel. Smaller cross-section core legs can be used. The smaller core legs in turn permit the use of cheaper bobbin-wound coils. All of these factors result in substantial cost savings.

In summary, with the present invention the grade and size of the ceramic magnets 18 are selected for cost-effective alternator output requirements and the effect of the high energy, which otherwise would be excessive at coil 44, is limited by the substantially larger air gap 92 at leg 60. This intentionally inefficient magnetic circuit permits a standard magneto coil 44 to be used for various different stators having different alternator output requirements. Moreover, the present invention facilitates the use of the same flywheel with magnetos having different output requirements. For example, the magnets can be selected for a flywheel to provide sufficient energy for a magneto having high energy requirements. The same flywheel can then be used with a magneto having lower energy requirements to generate a lower magneto output by merely enlarging the air gap at the center leg of the E core. Hence it will be apparent that the present invention is useful with magnetos without alternators and other magnetic circuits to limit output current at the coil and/or to make the coil output insensitive to variations in the air gap.

Although the present invention has been described for use with a breaker-point ignition of the type shown in FIG. 2b, it is also potentially useful with capacitor discharge ignitions where a capacitor charge coil would be used in place of the magneto coil 44. Again a large air gap for the charge coil, corresponding to gap 92 for the magneto application heretofore described, would limit the charge coil output which in turn would protect the silicon controlled rectifier and other components of the capacitor discharge ignition at higher engine speeds. Although the present invention has been disclosed in connection with high strength ceramic magnets, it is also potentially useful with alnico or other magnets that provide energy in excess of that required. The ceramic magnets are definitely preferred because their energy-to-cost ratio is not directly proportional to size or weight. With alnico magnets that are presently available commercially, the cost increases roughly in proportion to the size or weight. Circumferentially polarized alnico magnets could not be used in a magnetic structure as simple as that disclosed herein for radially polarized ceramic magnets.

It will be apparent that the magneto-alternator has been disclosed hereinabove for purposes of illustration and is not intended to indicate limits of the present invention, the scope of which is defined by the following claims.

I claim:

1. An electrical generating system for use in the ignition circuit of an internal combustion engine comprising a rotor adapted to be driven by said engine, magnetic means on said rotor to establish a magnetic field, a stator having a plurality of magnetic core legs thereon, said rotor and said stator being operatively arranged and disposed relative to each other so that said magnetic field is coupled to respective first and second core legs through respective first and second air gaps during relative rotation of said rotor and said stator, and an ignition coil on one of said first and second legs and responsive to said field to generate a first electrical output for igniting a spark at a spark plug and wherein said first air gap between said first leg and said magnetic means is substantially greater than said second air gap between said second core leg and said magnetic means so as to limit said output at said first coil at normal operating speeds of said engine without substantially limiting said output at starting speeds of said engine.

2. The system set forth in claim 1 wherein said core legs are radial core legs, said air gaps are radial air gaps and wherein said magnetic means includes at least two radially polarized ceramic magnets.

3. The system set forth in claim 1 wherein said stator further comprises a third core leg having a third air gap with said magnet means, said first, second and third core legs forming a generally E-shaped core with said first core leg being disposed between said second and said third core legs, said core legs being arranged so that a first magnetic flux path is provided from said magnetic means through said second air gap, said second core leg and said first core leg and said first air gap back to said magenetic means, and a second magnetic path is provided from said magnetic means through said first air gap, said first leg, said third leg and said third air gap, and wherein said first air gap is also substantially greater than said third air gap.

4. The system set forth in claim 1 wherein said first air gap is at least two times greater than said second air gap.

5. The system set forth in claim 4 wherein said first air gap is at least three times greater than said second air gap.

6. The system set forth in claim 1 wherein said first air gap is at least on the order of 0.100 of an inch longer than said second air gap.

7. The system set forth in claim 1 wherein said first air gap is on the order of 0.130 of an inch and said second air gap is on the order of 0.030 of an inch.

8. The system set forth in claim 1 wherein a second coil is disposed on said second core leg for generating a second electrical output in response to said magnetic field, said magnetic means being arranged and constructed to have a predetermined potential energy selected according to output requirements at said second coil, said predetermined energy being in excess of that required to meet output requirements at said first coil at higher rotor speeds if said first air gap were on the order of said second air gap.

9. The system set forth in claim 8 further comprising a third core leg disposed between said first and second core legs such that said field sequentially sweeps one of said first and said second core legs, then said third core leg and then the other of said first and second core legs, said stator includes further magnetic core means to establish a first magnetic flux path from said magnetic means through said first and third core legs back to said magnetic means and to also establish a second magnetic flux path from said magnetic means through said second and third core legs so that said third core leg is common to said first and second flux paths.

10. The system set forth in claim 9 wherein said magnetic means is arranged and constructed to establish first and second magnetic fields such that magnetic flux from said first magnetic field passes through said first flux path while magnetic flux from said second field passes through said second flux path.

11. The system set forth in claim 10 wherein said magnetic means includes at least three magnetic poles of alternate magnetic polarity such that when a first pole of first magnetic polarity is aligned with said first core leg, a second pole of the same magnetic polarity is aligned with said second core leg and said third pole of opposite magnetic polarity is aligned with said third core leg.

12. The system set forth in claim 11 wherein said core legs are radial core legs, said air gaps are radial air gaps and wherein said magnetic means includes radially polarized ceramic magnets to provide said three magnetic poles.

13. The system set forth in claim 9 further comprising fourth and fifth core legs disposed such that said magnetic field sequentially sweeps said fifth core leg, said fourth core leg, said first core leg, said third core leg and then said second core leg, a third coil on said fifth core leg, said fourth and fifth core legs being arranged and disposed such that said fourth core leg is in a third magnetic path through said first and said fourth core legs and also in a fourth magnetic path through said fourth and said fifth core legs.

14. The system set forth in claim 13 wherein said magnetic means includes at least three magnetic poles of alternate magnetic polarity such that when a first pole of a first magnetic polarity is aligned with said fifth core leg, a second pole of the same polarity is aligned with said first core leg and said third pole of opposite magnetic polarity is aligned with said fourth leg.

15. An electrical generating system for use in the ignition circuit of an internal combustion engine comprising a rotor adapted to be driven by said engine, magnetic means on said rotor to establish a magnetic field, a stator having a plurality of magnetic core legs thereon, said rotor and said stator being operatively arranged and disposed relative to each other so that said magnetic field is coupled to respective first and second core legs through respective first and second air gaps during relative rotation of said rotor and said stator, an ignition coil on said first leg and responsive to said field to generate a first electrical output for igniting a spark at a spark plug, said first air gap between said first leg and said magnetic means being substantially greater than said second air gap between said second core leg and said magnetic means so as to limit said output at said first coil, a second coil disposed on said second core leg for generating a second electrical output in response to said magnetic field, said magnetic means being arranged and constructed to have a predetermined potential energy selected according to output requirements at said second coil, said predetermined energy being in excess of that required to meet output requirements at said first coil at higher rotor speeds is said first air gap were on the order of said second air gap, a third core leg disposed between said first and second core legs, said stator including further magnetic core means to establish a first magnetic flux path from said magnetic means through said first and third core legs back to said magnetic means and to also establish a second magnetic flux path from said magnetic means through said second and third core legs so that said third core leg is common to said first and second flux paths, and fourth and fifth core legs disposed such that said magnetic field sequentially sweeps said fifth core leg, said fourth core leg, said first core leg, said third core leg and then said second core leg, a third coil on said fifth core leg, said fourth and fifth core legs being arranged and disposed such that said fourth core leg is in a third magnetic path through said first and said fourth core legs and also in a fourth magnetic path through said fourth and said fifth core legs, said magnetic means including at least five magnetic poles of alternate magnetic polarity such that when a first pole of a first magnetic polarity is aligned with said fifth core leg, a second pole of the same polarity is aligned with said first core leg, a third pole of opposite magnetic polarity is aligned with said fourth leg, a fourth pole of said opposite polarity is aligned with said third core leg and a fifth magnetic pole of said first polarity is aligned with said second core leg.

16. The system set forth in claim 15 wherein said core legs are radial core legs, said air gaps are radial air gaps and said magnetic means includes at least five radially polarized ceramic magnets.

17. A magneto-alternator comprising a stator core having at least three radial core legs with substantially equal circumferential spacing between end faces of adjacent core legs, a magneto coil mounted on a first core leg to generate a first electrical output for a breaker-point ignition circuit, an alternator coil mounted on said third leg to generate a second electrical output for use in other than said ignition circuit, said second core leg being disposed midway between said first and third core legs, a rotor having at least three radially polarized ceramic magnets to establish first, second and third magnetic poles of alternating magnetic polarity, said poles being adapted to sequentially sweep said first, second and third core legs and being spaced radially of said core leg faces to define first, second and third radial air gaps, respectively, said first air gap at said first core leg being at least twice as large as said second air gap at said second leg and said third air gap at said third leg, said magnetic poles having a circumferential spacing substantially equal to said circumferential spacing between said core leg faces so that said second core leg is common to a first flux path for said magneto coil through said first core leg and a second flux path through said third core leg for said alternator coil.

18. The magneto-alternator set forth in claim 17 wherein said second and third air gaps are substantially equal to each other.

19. The magneto-alternator set forth in claim 17 wherein said first air gap is at least on the order of three times as great as said second and said third air gaps.

20. The magneto-alternator set forth in claim 17 wherein said stator core further comprises a fourth core leg having a fourth air gap with said magnetic poles, said first, second and fourth core legs forming a generally E-shaped core with said first core leg being disposed between said second and said fourth core legs, and wherein said first air gap is also substantially greater than said third air gap.

21. The magneto-alternator set forth in claim 20 wherein said first, second and fourth core legs have a circumferential spacing substantially equal to said spacing between said magnetic poles such that said first core leg is common to flux paths for said magneto coil through said second and fourth core legs.

22. In the method of making a magneto-alternator for use in a breaker-point ignition system of an internal combustion engine by using a magneto coil that is also useful for non-alternator magnetos having a predetermined magnetic energy requirement for said magneto coil, said magneto-alternator being of the type having a rotor and a stator, said rotor having a plurality of radially polarized magnets, said stator having radial core legs and radial air gaps with said magnets, said magneto coil being mounted on a first one of said core legs, an alternator coil being mounted on a second core leg with a third core leg disposed substantially midway between said first and second core legs and providing a first magnetic path for said magneto coil through a first air gap at said first leg, said first leg, said third leg and a third air gap at said third leg and further providing a second magnetic path for said alternator coil through a second air gap at said second leg, said second leg, said third leg and said third air gap, the additional steps of providing by means of said magnets a high magnetic energy substantially greater than said predetermined energy required by said magneto coil but sufficient to cause said alternator coils to develop a predetermined alternator output and simultaneously limiting current in said magneto coil by making said first air gap substantially greater than at least one of said second and third air gaps.

23. In the method of making a magnetic circuit for use in either a first generating system having a first energy requirement to provide a first output or in a second generating system having a second energy requirement to provide a second output, said first energy requirement being higher than said second energy requirement, the steps of selecting a source of magnetic flux having a high magnetic energy and a corresponding first air gap in said magnetic circuit to satisfy the high energy requirements of said first generating system so that said magnetic circuit can be used in said first generating means to provide said first output and then limiting said second output by selecting in said second generating system a second predetermined air gap greater than said first predetermined air gap to reduce magnetic energy at a coil in said second generating system to a lower level sufficient to satisfy said second energy requirement and thereby produce said second output using the same said source of magnetic flux.

24. In the method of making a magnetic circuit for use in either an alternator including a rotor and a stator and having a first energy requirement to provide a first output or in a magneto having the same rotor as said alternator and having a second energy requirement to provide a second output, said first energy requirement being higher than said second energy requirement, the steps of selecting ceramic magnet means having a high magnetic energy and a corresponding first air gap in said magnetic circuit to satisfy the high energy requirements of said alternator so that said magnetic circuit can be used in said alternator to provide said first output, said magnetic energy of said ceramic magnet means being substantially greater than that required by said magneto, and then selecting in said magneto a second predetermined air gap greater than said first predetermined air gap to reduce magnetic energy at a coil in said magneto to a lower level sufficient to satisfy said second energy requirement and thereby produce said second output using the same said ceramic magnet means, said first and second air gaps being defined at least in part between said rotor and said stator.

25. The method set forth in claim 24 wherein said second air gap is selected so that the ratio of said second energy requirement to said available energy is less than 50 percent.

26. The method set forth in claim 24 wherein said second air gap is selected so that the ratio of said second energy requirement is less than 30 percent.

27. In an ignition system for use with a internal combustion engine comprising a coil, a flux circuit including a core, an air gap and high energy magnet means, at least part of said flux circuit being rotatable relative to the remaining part of said flux circuit with said air gap being defined at least in part between the relatively rotatable parts of said flux circuit, said coil being mounted on said core and having an electrical output, a spark plug, circuit means operatively coupling said coil to said spark plug to produce a spark at said plug, said coil output being a function of the length of said air gap according to a predetermined output versus air gap length characteristic, said characteristic having a first portion at small air gaps wherein a predetermined variation in air gap length causes a large variation in said output and a second portion at substantially larger air gaps wherein said predetermined variation in air gap length produces a smaller variation in said output, the improvement wherein said air gap in said ignition system is set at a preselected length at which said magnetic circuit operates on said second portion of said characteristic at a point such that production tolerances of about ± 0.010 of an inch cause output variations on the order of less than 20 percent.

28. In an ignition system for use with an internal combustion engine, a coil, a flux circuit including a core, an air gap and magnet means having a predetermined available magnetic potential energy, at least part of said flux circuit being rotatable relative to the remaining part with said air gap being defined at least in part between said relatively rotatable parts, said coil being mounted on said core and having a predetermined energy requirement to generate an electrical output, a spark plug, circuit means operatively coupling said coil to said plug to produce a spark at said plug, the improvement wherein said air gap in said ignition system is set at a preselected length at which the ratio of said predetermined energy requirement to said available magnetic energy is less than 50 percent.

29. The system set forth in claim 28 wherein said ratio is less than 30 percent.

* * * * *

UNITED STATES PATENT AND TRADEMARK OFFICE
CERTIFICATE OF CORRECTION

PATENT NO. : 4,061,121
DATED : December 6, 1977
INVENTOR(S) : John Norman MacLeod It is certified that error appears in the above-identified patent and that said Letters Patent are hereby corrected as shown below:

Col. 2, line 32, "de" should be deleted

Col. 9, line 24 (Claim 15) "is" should be -- if --.

Col. 11, line 38 (Claim 27) "a" should be -- an --.

Signed and Sealed this

Eleventh Day of April 1978

[SEAL]

Attest:

RUTH C. MASON
Attesting Officer

LUTRELLE F. PARKER
Acting Commissioner of Patents and Trademarks